(12) United States Patent
Steadman

(10) Patent No.: US 7,219,375 B2
(45) Date of Patent: May 22, 2007

(54) TOILET FLUSHING ARRANGEMENT

(76) Inventor: David William Steadman, 7858 Meadow Lark La., Port Saint Lucie, FL (US) 34952

( * ) Notice: Subject to any disclaimer, the term of this patent is extended or adjusted under 35 U.S.C. 154(b) by 152 days.

(21) Appl. No.: 10/852,558

(22) Filed: May 24, 2004

(65) Prior Publication Data
US 2004/0261165 A1    Dec. 30, 2004

(30) Foreign Application Priority Data
May 24, 2003   (GB) .................. 0312014.4

(51) Int. Cl.
E03D 1/14   (2006.01)

(52) U.S. Cl. .................. 4/325; 4/324; 4/326; 4/415
(58) Field of Classification Search ........... 4/324–326, 4/415
See application file for complete search history.

(56) References Cited

U.S. PATENT DOCUMENTS

| 1,037,679 | A | * | 9/1912 | Snyder ........................ 4/363 |
|---|---|---|---|---|
| 3,041,630 | A | * | 7/1962 | Williams ..................... 4/326 |
| 3,811,134 | A | * | 5/1974 | Throckmorton et al. ...... 4/415 |
| 3,945,056 | A | | 3/1976 | Kowalski et al. |
| 3,946,447 | A | | 3/1976 | Moon et al. |
| 4,171,547 | A | * | 10/1979 | Raz ............................. 4/326 |
| 4,225,985 | A | * | 10/1980 | Joshi et al. .................. 4/324 |
| 4,392,260 | A | | 7/1983 | Bensen |
| 4,817,216 | A | | 4/1989 | Auman |
| 5,003,644 | A | * | 4/1991 | Huang ......................... 4/324 |
| 5,003,647 | A | * | 4/1991 | Williams ..................... 4/559 |
| 5,067,180 | A | | 11/1991 | Figeroid |
| 5,111,537 | A | * | 5/1992 | Zaruba ........................ 4/324 |
| 5,301,373 | A | | 4/1994 | Hull et al. |
| 5,502,846 | A | * | 4/1996 | Chelchowski et al. ......... 4/325 |
| 5,713,086 | A | | 2/1998 | Diethelm |

FOREIGN PATENT DOCUMENTS

| ES | 2097680 | 4/1997 |
|---|---|---|
| GB | 2343685 | 5/2000 |

* cited by examiner

Primary Examiner—Khoa D. Huynh
(74) Attorney, Agent, or Firm—Tarolli, Sundheim, Covell & Tummino LLP

(57) ABSTRACT

A flushing arrangement (30) including an opened topped housing (32) surrounding the flush valve (12). An opening (40) is provided in a lower part of the housing (32) with a selectively openable gate (44). The arrangement (30) is configured such that for a low volume flush the gate (44) is closed and only water in the housing (32) or located thereabove will be flushed, and for a high volume flush the gate (44) is open wherein substantially all of the water in the cistern (20) above the lowest part of the opening (40) is flushed.

12 Claims, 6 Drawing Sheets

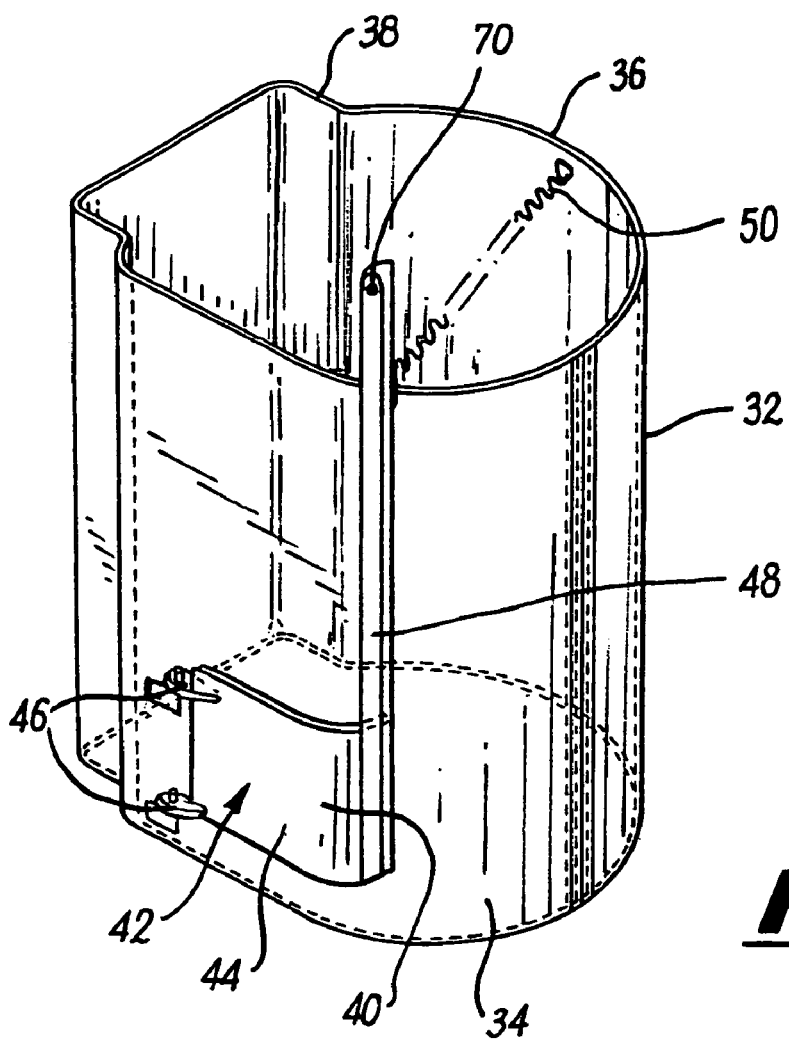
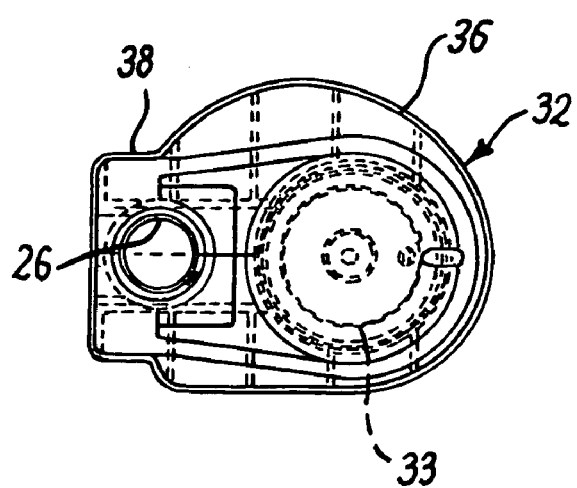

TOILET FLUSHING ARRANGEMENT

This invention concerns a toilet flushing arrangement, and also a toilet flushing system incorporating such an arrangement.

With conventional flushing toilets, a significant amount of water is used with each flush which after certain uses is not wholly required and is thus wasteful of water. Dual flushing arrangements are available providing for low volume and high volume flushes, but these are generally of relatively complex configuration. Furthermore, such arrangements usually cannot be retrofitted, and therefore if dual flushing is required, new flushing systems are needed for each toilet at a location.

According to the present invention there is provided a toilet flushing arrangement, the arrangement comprising an open topped sleeve locatable in a toilet cistern to surround the flush outlet and to extend to a required height in the cistern, with a selectively openable opening provided in a lower part of the sleeve, such that the arrangement provides two flushing modes: a low volume flush with the opening closed, wherein substantially only the water within the sleeve plus the volume of any water located above the top of the sleeve, is flushed; and a high volume flush with the opening open, wherein substantially the volume of the water in the cistern, whether or not in the sleeve, above the lowest part of the opening, is flushed.

A closure may be provided, selectively locatable over the opening to close same. The closure may be spring urged to a closed position. The closure may be located on the outside of the sleeve, and may be pivotally mounted thereto.

A control arrangement may be provided such that a first operation thereof causes a low volume flush, and a second operation thereof causes a high volume flush.

The control arrangement may be provided with a pivotally movable handle, such that a first pivotal movement thereof causes a low volume flush, and a further pivotal movement in the same direction causes a high volume flush.

The control arrangement may be configured such that after a first pivotal movement of the handle the spring urging of the closure can be felt and must be overcome to cause a high volume flush.

The control arrangement may include a cam arrangement enagagable with a control mechanism for the flush valve, such that pivotal movement of the control mechanism causes pivotal movement of the cam arrangement.

The sleeve may have a base, and a hole may be provided therein, or can be formed therein, to locate around the flush outlet.

The sleeve may have markings and/or areas of weakness provided at an upper part thereof to permit the sleeve to be formed to a required height.

Alternatively, or in addition selectively removable openings or cut-outs may be provided in an upper part of the sleeve to allow the effective height of the sleeve to be selected.

As a further possibility, the sleeve could include a further sleeve part mounted in a telescopic manner thereto, and the effective height of the sleeve can be adjusted by telescopic movement of the further sleeve part.

The sleeve may be formed with areas or lines of weakness on each side thereof to permit the opening to be provided on a respective required side of the sleeve for either left handed or right handed operation.

The sleeve and flush valve may be formed as a single unit. Alternatively, the sleeve may be fitted around an existing flush valve.

The invention also provides a toilet flushing system, the system comprising a cistern, a flush valve, control apparatus for the flush valve, and a toilet flushing arrangement according to any of the preceding twelve paragraphs operably located in the system.

Embodiments of the present invention will now be described by way of example only and with reference to the accompanying drawings, in which:

FIG. 3 is a diagrammatic perspective view of part of the system of FIG. 2;

FIG. 4 is a diagrammatic plan view of part of the system of FIG. 2;

Figure 1:
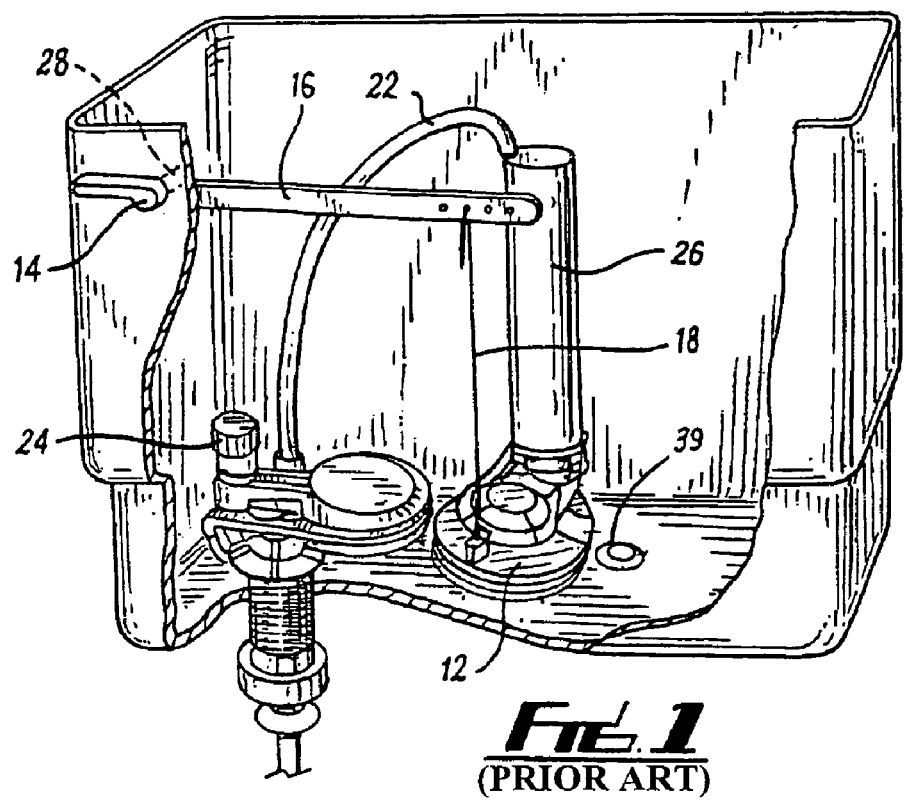
FIG. 1 is a diagrammatic cutaway view of a conventional toilet flushing system.

FIG. 1 shows a conventional toilet flushing system 10 with a flush valve 12 operated by a lever 14 which causes pivotal movement of a bar 16 which connects to the valve 12 by a link 18. In use the cistern 20 in which the system 10 is located automatically fills through a refill tube 22 to a required height. This required height can be adjusted using the knob 24. Filling takes place into an overflow pipe 26 which can receive water in the event that excess water is supplied into the cistern 20.

To flush the system 10, the lever 14 is pushed downwardly causing pivotal movement about its mounting 28. This raises the bar 16 and hence link 18 and causes the flush valve 12 to operate. Following flushing, the flush valve 12 will automatically reclose and the cistern 20 will be refilled through the tube 22. There are of course other conventional types of flushing systems, incorporating for instance a floating ball valve or other type of floating valves which cause the cistern to stop filling when a required water level therein is detected.

Figure 2:
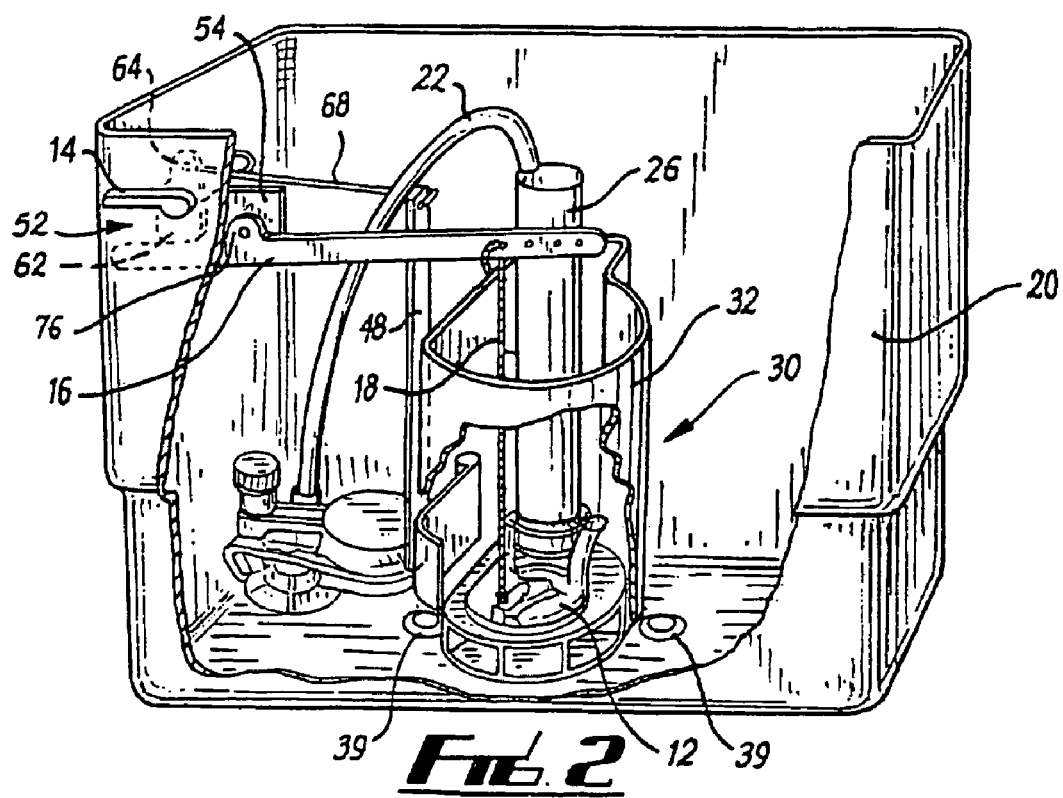
FIG. 2 is a similar view to FIG. 1 but incorporating a first toilet flushing arrangement according to the invention.
Figure 5:
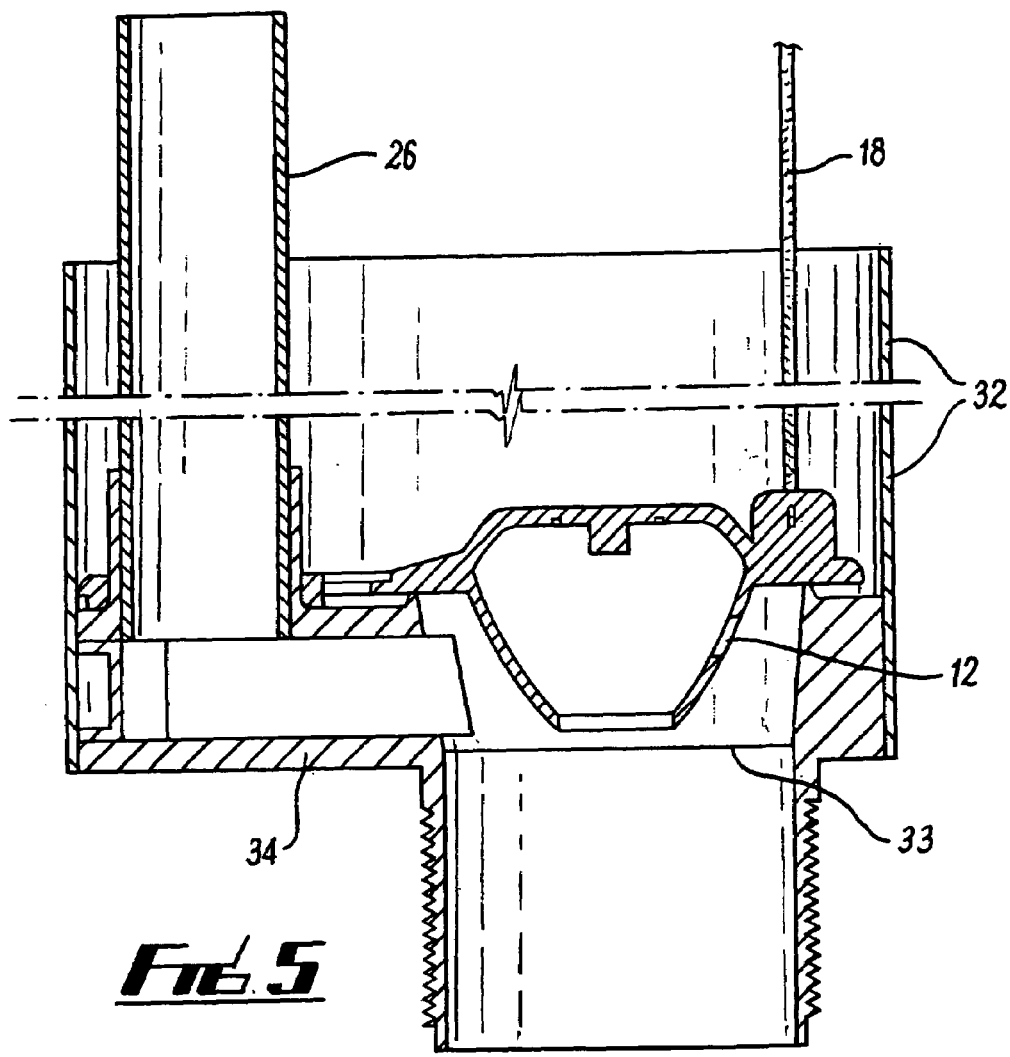
FIG. 5 is a diagrammatical cross-sectional view through part of the system of FIG. 2.
Figure 6:
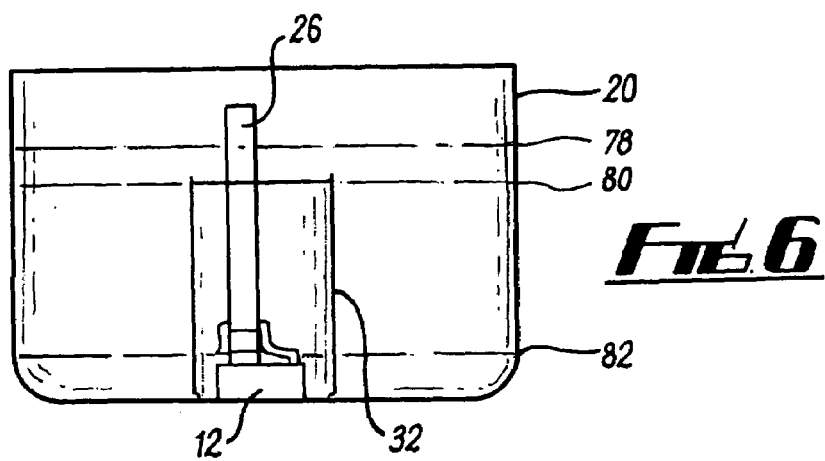
FIG. 6 is a diagrammatic front view of the system of FIG. 2.
Figure 7:
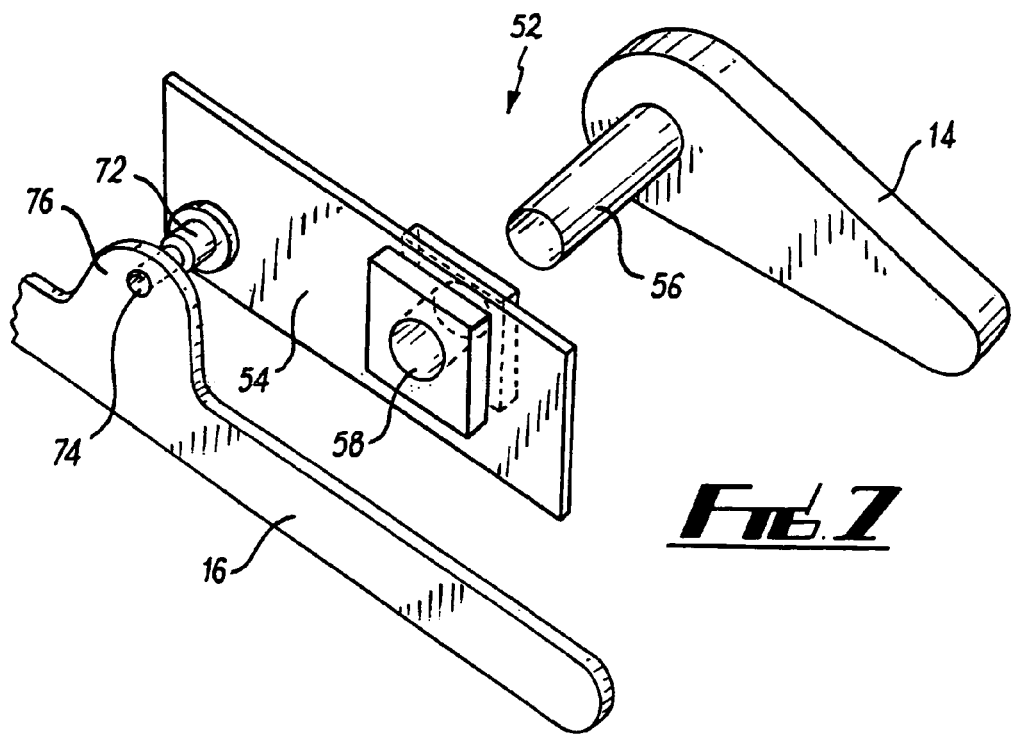
FIGS. 7, 8 and 9 are diagrammatic perspective views of components of a control arrangement of the system of FIG. 2.
Figure 8:
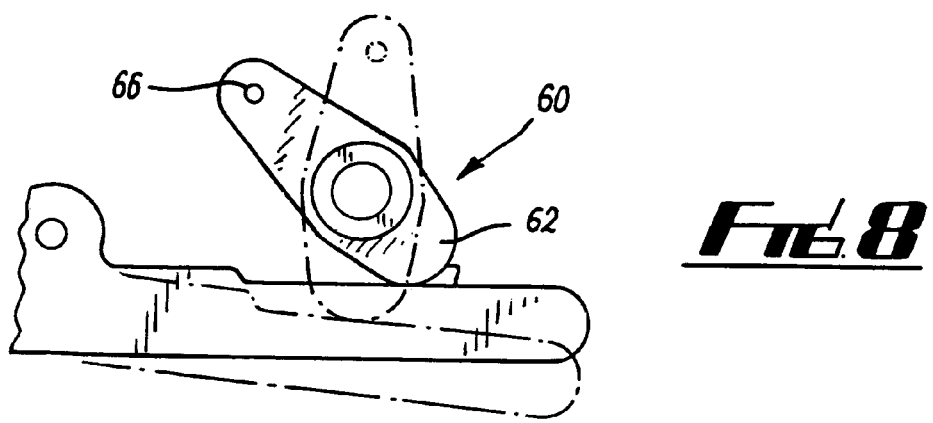
Figure 9:
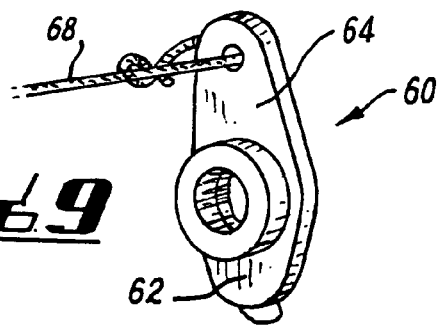

FIGS. 2 to 9 show a first toilet flushing arrangement 30 according to the invention fitted to the system 10 shown in FIG. 1. The arrangement 30 comprises an open topped housing 32 with an opening 33 in the base 34 thereof through which flushing water can pass. In plan view the housing 32 has a generally circular front section 36 extending from a smaller generally rectangular rear section 38. These shapes are chosen so as to not cover and thus permit free access to, the conventional mounting holes 39 for the cistern 20. An opening 40 is provided on the side of the housing 32 towards the base 34 thereof, on the left hand side as shown in FIG. 2.

A closure 42 is provided for the opening 40 in the form of a gate 44 which is pivotally mounted by projections 46 thereon to the outside of the housing 32. An upwardly extending bar 48 is provided at the free end of the gate 44, which mounts towards its upper end one end of a spring 50. The other end of the spring 50 is mounted to a hole adjacent the top of the housing 32 on an opposite side thereof. The spring 50 urges the gate 44 to a closed position.

A control arrangement 52 is provided for selective opening of the gate 44 as follows. The control arrangement 52 connects to the lever 14, and includes a rectangular plate 54 which is mounted in the cistern 20. A shaft 56 extends from the lever 14 through a hole 58 in the plate 54. A cam member 60 is mounted on the free end of the shaft 56 within the cistern. The cam member comprises a lower part 62 providing a cam surface engageable against the bar 16 towards the left hand end thereof, as shown in FIG. 2. The cam member 60 also comprises a diametrically opposite upper part 64 in the form of a finger with an opening 66 therein to receive one end of a cable 68 which connects to a hole 70 provided at the upper end of the bar 48.

The bar 16 is pivotally mounted towards its left hand end as shown in FIG. 2 by a projection 72 on the plate 54 which engages in a hole 74 provided on a projecting part 76 of the bar 16. The end of the bar 16 extending from the projecting part 76 is substantially straight and engages with the cam surface of the lower part 62.

In use, if only a low volume flush is required, the lever 14 is pressed downwardly until any particular resistance is felt. This causes flushing in a conventional manner with the cam member 60 engaging against the bar 16 lifting the link 18 and hence flush valve 12, thereby causing water to be flushed into the toilet. The water flushed is however only the volume within the housing 32 and also the volume spaced above the top of the housing 32 i.e. that between the lines 78 and 80 in FIG. 6.

When it is required to have a higher volume of flush, the lever 14 is pushed further down against the felt resistance, which is in fact provided by the spring 50. This causes further rotation of the cam member 60, which does not cause further pivoting of the bar 16 as the cam member 60 will be moving from the position shown by dotted lines in FIG. 8. This rotation does though cause the cable 68 to pull the bar 48 away from the housing 32 against the force of the spring 50, and hence open the gate 44. Therefore in this flush all the water above the line 82 (FIG. 6) which is level with the bottom of the opening 40, will flush, irrespective of whether this water is in the housing 32 or outside thereof.

Figure 10:
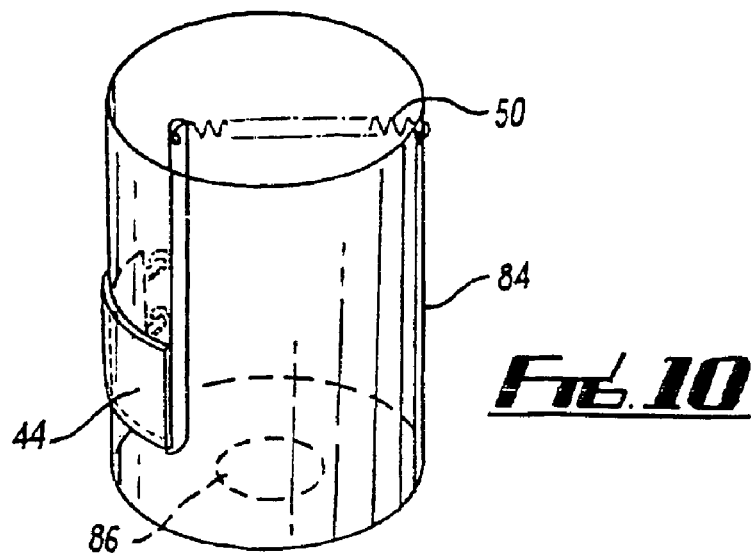
FIG. 10 is a diagrammatic perspective view of part of a second system according to the invention.

FIG. 10 shows an alternative housing 84 of a second arrangement, which housing 84 in this instance is cylindrical. A hole 86 which could be cut by an installer is shown, which would locate around the flush outlet of a cistern. Whilst in FIG. 5 the flush valve 12 is shown as a single unit with the housing 32, the arrangement can readily be retrofitted to an existing toilet flushing system with a housing such as the type 32 or the type 84.

Figure 11:
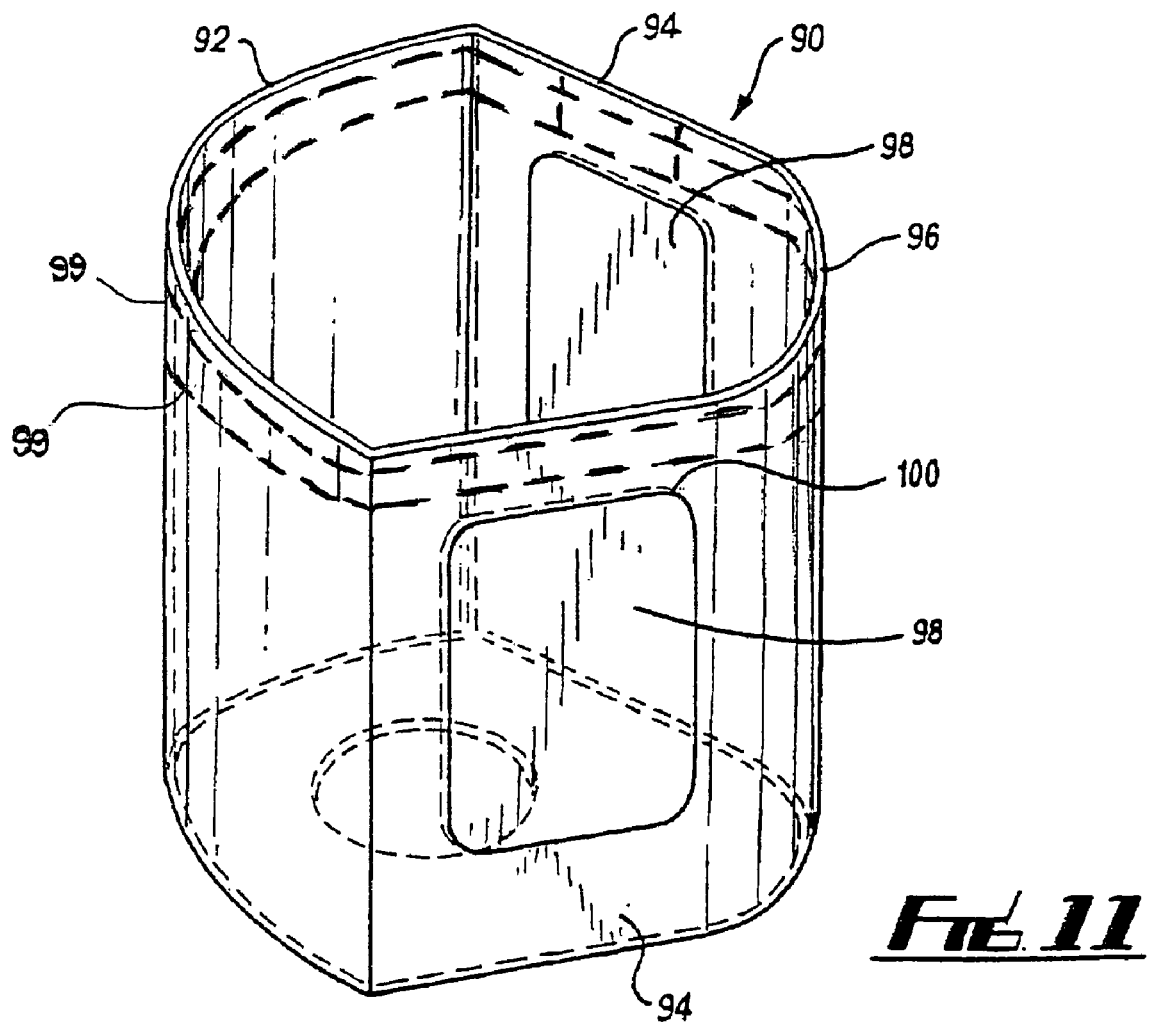
FIG. 11 is a similar view to FIG. 10 of part of a third system according to the invention.
Figure 12:
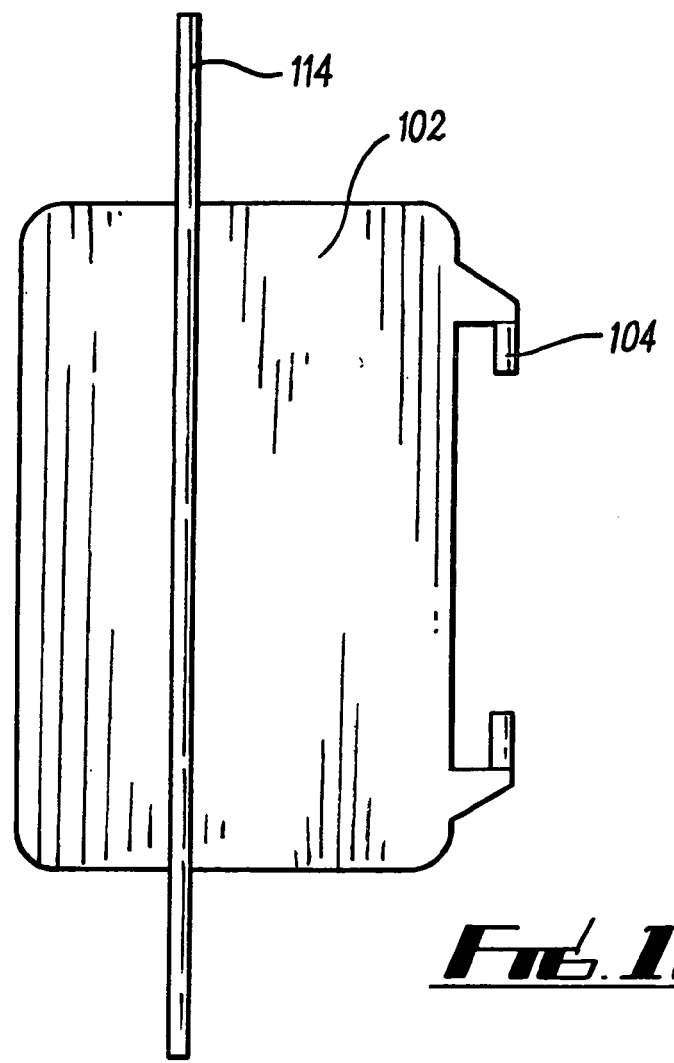
FIGS. 12 and 13 are diagrammatic side views of further parts of the third system.
Figure 13:
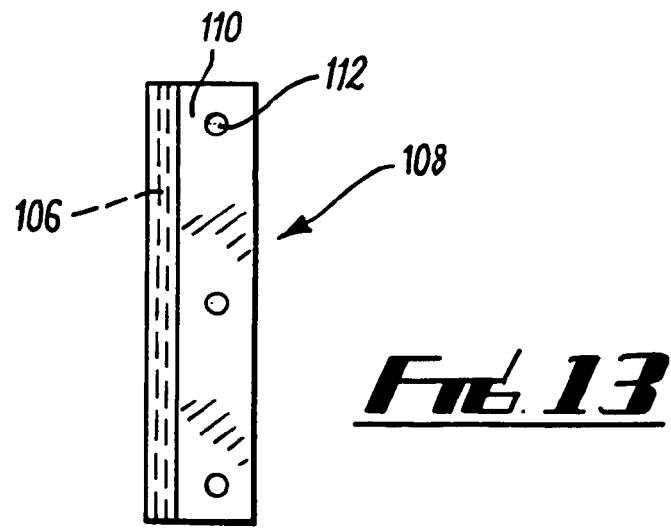

FIGS. 11 to 13 show components of a third arrangement. FIG. 11 shows a housing 90 which in plan view has an arcuate end 92, which would normally be located towards the rear of a cistern, with two inclined converging side walls 94 extending from the ends thereof, which are connected by a curved apex 96. A panel 98 is provided in each of the walls delimited by a line of weakness 100. A respective one of the panels 98 can be removed to provide respectively left handed or right handed operation of the arrangement as required. Further, selectively removable openings 99 are provided in an upper part of the housing 90 to allow the effective height of the housing to be selected.

FIG. 12 shows a closure 102 which can be mounted to respectively selectively close either of the openings formed by removal of a respective one of the panels 98. The closure 102 has two vertical inwardly facing pins 104 locatable in a semi-circular recess 106 of a hinge plate 108 shown in FIG. 13. The plate 108 is mountable to the housing 90 adjacent a respective opening by a mounting flange 110 using for instance holes 112 in the flange 110, or using glue. A bar 114 extends from the top and bottom of the closure 102 for engagement with an operating arrangement similar to that shown for the arrangement 30.

Various other modifications may be made without departing from the scope of the invention. For instance, an upper part of the housing could be provided with markings and/or lines of weakness to enable the housing to be cut to a required height for a particular toilet system. Alternatively, selectively removable openings or cut outs can be provided in an upper part of the housing which could be removed as required to provide an effective top height of the housing.

There are thus described arrangements which provide for a simple yet effective way of providing a dual flush in a toilet flushing system. The arrangements can be selected to provide a required volume of water in a low volume flush. The arrangements can readily be retrofitted to existing toilets, or supplied new as a complete unit. The arrangements are of relatively simple construction and can thus be inexpensively and robustly manufactured.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A toilet flushing arrangement comprising:
   a) an open topped sleeve locatable in a toilet cistern to surround a flush outlet that allows water to leave the cistern, the open topped sleeve extending to a required height in the cistern,
   b) the sleeve having sides, each of said sides having an area of weakness for selectively positioning a selectively openable opening provided in a lower part of the sleeve for a selected one of a left handed and right handed operation such that the arrangement provides two flushing modes:
      i. a low volume flush with the opening closed, wherein substantially only the water within the sleeve plus the volume of any water located above the top of the sleeve, is flushed; and
      ii. a high volume flush with the opening open, wherein substantially the volume of the water in the cistern, above the lowest part of the opening is flushed;
   c) a closure is selectively located and pivotally mounted over said opening to open or close said opening; and
   d) a linkage mechanism connected to a single pivotally movable handle and to said pivotally closure such that a first pivotal movement thereof actuates said linkage mechanism to produce the low volume flush, and a further pivotal movement in the same direction actuates said linkage mechanism and said closure to produce the high volume flush.

2. The arrangement according to claim 1 characterized in that the closure is located on the outside of the sleeve.

3. The arrangement according to claim 1, characterized in that the sleeve has a base, and a hole therein, to locate around the flush outlet.

4. The arrangement according to claim 3, characterized in that selectively removable openings are provided in an upper part of the sleeve to allow the effective height of the sleeve to be selected.

5. The arrangement according to claim 1, characterized in that the sleeve is fitted around an existing flush valve.

6. The arrangement according to claim 1, wherein said opening located in said sleeve is on a planer surface.

7. A kit for converting a single volume flush toilet to a toilet having a multi-volume flush capability comprising;
   a) a open top tubular housing for positioning in a cistern in surrounding relationship to a cistern outlet valve, the housing having at least one selectively removable opening in an upper part of the housing to allow the effective height of the sleeve to be selected;
   b) the housing including sides, each of said sides having an area of weakness for selectively positioning a selectively openable opening in a lower part of the sleeve for a selected one of a left handed and right handed operation;
   c) a closure for the opening, the closure when in use being moveable between a closed position blocking flow through the opening and an open position allowing flow through the opening; and
   d) a lever arrangement comprising a rotatable handle and linkage assembly connectable to the outlet valve for opening the valve by rotation of the handle to a first position actuates the linkage assembly to produce a low volume flush and further rotation of the handle in the same direction actuates the linkage assembly and the closure to produce a high volume flush.

8. A toilet flushing arrangement comprising:
   a) an open topped sleeve having a first and a second side, the sleeve locatable in a toilet cistern to surround a flush outlet and to extend to a required height in the cistern,
   b) a first panel and a second panel are located on said first and second sides, respectively, each of said panels delimited by a line of weakness for providing a selectively openable opening in a lower part of the sleeve such that the arrangement provides two flushing modes:
      i. a low volume flush with the opening closed, wherein substantially only the water within the sleeve plus the volume of any water located above the top of the sleeve, is flushed; and
      ii. a high volume flush with the opening open, wherein substantially the volume of the water in the cistern, above the lowest part of the opening is flushed;
   c) a linkage mechanism connected to a pivotally movable handle such that a first pivotal movement thereof actuates the linkage to produce the low volume flush, and a second pivotal movement in the same direction actuates the linkage to produce the high volume flush; and
   d) selectively removable openings provided in the upper part of the sleeve to allow the effective height of the sleeve to be selected.

9. The arrangement according to claim 8, wherein said first and second sides are connected at a first end by an arcuate wall and at a second end by a curved apex for facilitating the positioning of the sleeve within the cistern about the flush outlet.

10. The arrangement according to claim 8, wherein said first and second sides include a planer surface about which said first and second panels are located.

11. The arrangement according to claim 8, wherein said first and second sides include a planer surface about which said first and second panels are located, said sides being separated by a curved apex.

12. The arrangement according to claim 8, wherein said first panel is spaced from said second panel.

\* \* \* \* \*

UNITED STATES PATENT AND TRADEMARK OFFICE
CERTIFICATE OF CORRECTION

| | | |
|---|---|---|
| PATENT NO. | : 7,219,375 B2 | Page 1 of 1 |
| APPLICATION NO. | : 10/852558 | |
| DATED | : May 22, 2007 | |
| INVENTOR(S) | : William David Steadman | |

It is certified that error appears in the above-identified patent and that said Letters Patent is hereby corrected as shown below:

On the title page item (75) inventors "David William Steadman" should read --William David Steadman--

Signed and Sealed this

Sixth Day of November, 2007

JON W. DUDAS
*Director of the United States Patent and Trademark Office*